(12) United States Patent
Mahendran et al.

(10) Patent No.: US 12,430,903 B2
(45) Date of Patent: Sep. 30, 2025

(54) OBJECT RECOGNITION NEURAL NETWORK TRAINING USING MULTIPLE DATA SOURCES

(71) Applicant: Magic Leap, Inc., Plantation, FL (US)

(72) Inventors: Siddharth Mahendran, Mountain View, CA (US); Nitin Bansal, Sunnyvale, CA (US); Nitesh Sekhar, Mountain View, CA (US); Manushree Gangwar, San Francisco, CA (US); Khushi Gupta, Mountain View, CA (US); Prateek Singhal, Mountain View, CA (US); Tarrence Van As, New York, NY (US); Adithya Shricharan Srinivasa Rao, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 374 days.

(21) Appl. No.: 18/007,288

(22) PCT Filed: Jul. 28, 2021

(86) PCT No.: PCT/US2021/043543
§ 371 (c)(1),
(2) Date: Jan. 27, 2023

(87) PCT Pub. No.: WO2022/026603
PCT Pub. Date: Feb. 3, 2022

(65) Prior Publication Data
US 2023/0290132 A1 Sep. 14, 2023

Related U.S. Application Data

(60) Provisional application No. 63/058,265, filed on Jul. 29, 2020.

(51) Int. Cl.
*G06V 10/82* (2022.01)
*G06V 10/764* (2022.01)

(52) U.S. Cl.
CPC ............ *G06V 10/82* (2022.01); *G06V 10/764* (2022.01)

(58) Field of Classification Search
None
See application file for complete search history.

(56) References Cited

U.S. PATENT DOCUMENTS

| 10,936,902 B1* | 3/2021 | Bagwell | G06T 7/73 |
| 2010/0042434 A1* | 2/2010 | Luo | G16H 50/20 |
| | | | 705/3 |

(Continued)

OTHER PUBLICATIONS

International Search Report and Written Opinion in PCT/US2021/043543, dated Nov. 2, 2021 (9 pages).

(Continued)

*Primary Examiner* — Leon Flores
(74) *Attorney, Agent, or Firm* — Fish & Richardson P.C.

(57) ABSTRACT

Methods, systems, and apparatus, including computer programs encoded on a computer storage medium, for training an object recognition neural network using multiple data sources. One of the methods includes receiving training data that includes a plurality of training images from a first source and images from a second source. A set of training images are obtained from the training data. For each training image in the set of training images, contrast equalization is applied to the training image to generate a modified image. The modified image is processed using the neural network to generate an object recognition output for the modified image. A loss is determined based on errors between, for each training image in the set, the object recognition output for the modified image generated from the training image and ground-truth annotation for the training image. Parameters of the neural network are updated based on the determined loss.

20 Claims, 5 Drawing Sheets

(56) References Cited

U.S. PATENT DOCUMENTS

| | | | |
|---|---|---|---|
| 2017/0061625 A1 | 3/2017 | Estrada et al. | |
| 2018/0130213 A1* | 5/2018 | Yan | G06T 7/10 |
| 2019/0340435 A1 | 11/2019 | Rabinovich et al. | |
| 2020/0236296 A1 | 7/2020 | Holzer et al. | |
| 2020/0278408 A1* | 9/2020 | Sung | G06V 10/764 |
| 2021/0150227 A1* | 5/2021 | Hu | G06V 20/64 |
| 2021/0287089 A1* | 9/2021 | Mayer | G06N 3/04 |

OTHER PUBLICATIONS

Girshick et al., "Rich feature hierarchies for accurate object detection and semantic segmentation," Proceedings of the IEEE Conference on Computer Vision and Pattern Recognition, cs.CV, Submitted on Oct. 22, 2014, arXiv:1311.2524v5, 21 pages.

He et al., "Mask R-CNN," Proceedings of the IEEE International Conference on Computer Vision, cs.CV, Submitted on Jan. 24, 2018, arXiv:1703.06870v3, 12 pages.

Ren et al., "Faster R-CNN: Towards real-time object detection with region proposal networks, " Advances in Neural Information Processing Systems, cs.CV, Submitted on Jan. 6, 2016, arXiv:1506.01497v3, 14 pages.

* cited by examiner

OBJECT RECOGNITION NEURAL NETWORK TRAINING USING MULTIPLE DATA SOURCES

CROSS-REFERENCE TO RELATED APPLICATIONS

This patent application is a National Stage Application of International Application No. PCT/US2021/043543, filed Jul. 28, 2021, which claims priority to and the benefit of U.S. Provisional Patent Application No. 63/058,265, filed on Jul. 29, 2020 and entitled "OBJECT RECOGNITION NEURAL NETWORK TRAINING USING MULTIPLE DATA SOURCES," which applications are hereby incorporated herein by reference in their entirety.

TECHNICAL FIELD

This application relates generally to a cross reality system.

BACKGROUND

Computers may control human user interfaces to create an X Reality (XR or cross reality) environment in which some or all of the XR environment, as perceived by the user, is generated by the computer. These XR environments may be virtual reality (VR), augmented reality (AR), and mixed reality (MR) environments, in which some or all of an XR environment may be generated by computers using, in part, data that describes the environment. This data may describe, for example, virtual objects that may be rendered in a way that users' sense or perceive as a part of a physical world and can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. AR and MR, in contrast to VR, include one or more virtual objects in relation to real objects of the physical world. The experience of virtual objects interacting with real objects greatly enhances the user's enjoyment in using the XR system, and also opens the door for a variety of applications that present realistic and readily understandable information about how the physical world might be altered.

To realistically render virtual content, an XR system may build a representation of the physical world around a user of the system. This representation, for example, may be constructed by processing images acquired with sensors on a wearable device that forms a part of the XR system. In such a system, a user might perform an initialization routine by looking around a room or other physical environment in which the user intends to use the XR system until the system acquires sufficient information to construct a representation of that environment. As the system operates and the user moves around the environment or to other environments, the sensors on the wearable devices might acquire additional information to expand or update the representation of the physical world.

The system may recognize objects in the physical world using a two-dimensional (2-D) object recognition system. For example, the system may provide an image acquired with a sensor on the wearable device as an input to a 2-D bounding box generation system. The system may receive a respective 2-D bounding box for each of the objects that have been recognized in the image. The XR system can build a representation of the physical world using the 2-D bounding boxes for the objects that have been recognized. As the user moves around the environment or to other environments, the XR system can expand or update the representation of the physical world using the 2-D bounding boxes for the objects that have been recognized in additional images acquired by the sensors.

BRIEF SUMMARY

Aspects of the present application relate to methods and apparatus for training an object recognition neural network using multiple data sources. Techniques as described herein may be used together, separately, or in any suitable combination.

In general, one innovative aspect of the subject matter described in this specification can be embodied in methods that include the actions of receiving training data that includes a plurality of training images and, for each image, a respective ground-truth annotation, the plurality of training images including images from a first source and images from a second source; obtaining a set of training images from the training data; for each training image in the set of training images: applying contrast equalization to the training image to generate a modified image; and processing the modified image using the neural network to generate an object recognition output for the modified image; determining a loss based on errors between, for each training image in the set, the object recognition output for the modified image generated from the training image and the ground-truth annotation for the training image; and updating parameters of the neural network based on the determined loss. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

The foregoing and other embodiments can each optionally include one or more of the following features, alone or in combination. In particular, one embodiment includes all the following features in combination. Obtaining a set of training images from the training data includes: sampling an initial set of images from the training data; and generating the set of training images by discarding one or more training images from the initial set. Generating the set of training images includes: determining that one or more of the images in the initial set of images have motion blur; and in response, discarding the one or more images that have motion blur. Generating the set of training images includes: determining, from the ground-truth annotations for the training images in the initial set of images, that one or more of the images in the initial set of images depict objects that do not belong to a relevant object category; and in response, discarding the one or more images that depict objects that do not belong to a relevant object category. Generating the set of training images includes: determining that one or more of the images in the initial set of images depict an object that is truncated or occluded; and in response, discarding the one or more images that depict an object that is truncated or occluded. Determining that one or more of the images in the set of training images depict an object that is truncated or occluded includes: obtaining, from the ground-truth annotations for the training images in the initial set of images, truncation scores or occlusion scores previously computed based on the ground-truth annotations, and wherein computing the truncation scores or occlusion scores including: obtaining, from the ground-truth annotations, a three-dimensional (3-D) bounding box and a two-dimensional (2-D) bounding box for an object in a training image from the initial set of images; generating a projected 2-D bounding box by projecting the 3-D bounding box to the training image; and computing a truncation score or an occlusion score using an overlap between the projected 2-D bounding box and the 2-D bounding box from the ground-truth annotations; and determining, based on the truncation scores or occlusion scores, that one or more of the images in the initial set of images depict an object that is truncated or occluded. Determining the loss includes: for each training image in the set: determining a count of images from the set that have a same ground-truth annotation as the training image; determining, based on the count, a weight for the training image; and generating, from the error between the object recognition output for the modified image generated from the training image and the ground-truth annotation for the training image, a weighted error based on the weight for the training image; and determining the loss based on the weighted errors for the images in the set. The ground-truth annotation for the training image depicts an object that belongs to a k-th object category among K object categories, and the weight $w_k$ for the training image is $$w_k = 1 + 2 * \left(1 - \frac{c_k}{c_{max}}\right),$$

where $c_k$ is the count of images from the set that has the same ground-truth annotation as the training image, and $c_{max}$ is the maximum value of all values among counts of images $c_i$, i=1, . . . , K. The first source is a set of real-world images and the second source is a set of synthetic images. The object recognition output includes: a bounding box, and a localization score that is a prediction of an intersection-over-union overlap between the bounding box and a ground-truth bounding box. The object recognition output includes: an instance mask, and a mask score that is a prediction of an intersection-over-union overlap between the instance mask and a ground-truth instance mask.

The subject matter described in this specification can be implemented in particular embodiments so as to realize one or more of the following advantages. An object recognition neural network can be trained with training data from multiple data sources, e.g., real-world images and synthetic images, by applying contrast equalization to the training data, instead of relying on complicated domain adaptation neural network algorithms or complicated domain adaptation systems. The object recognition neural network can be trained to perform object recognition tasks for more object categories with high accuracy with data balancing techniques and data filtering strategies. For example, the object recognition neural network can be trained with a set of training images that include different numbers of training images for different object categories, by calculating a weighted loss based on a weight for each training image in the set of training images. A set of training images can be selected from the training data through an online data filtering strategy that can select or discard one or more training images during the training of an object recognition neural network, without a need for re-labeling the training data for training different object recognition neural networks that may have different object categories of interest.

The object recognition neural network can predict a localization score which is an intersection-over-union overlap between a predicted object bounding box and a ground-truth object bounding box. The object recognition neural network can predict a mask score which is an intersection-over-union overlap between a predicted object segmentation mask and a ground-truth object segmentation mask. The localization score or the mask score can be a confidence score indicating the accuracy of the predicted object bounding box or the predicted object mask.

Based on a passable world model generated or updated from the object recognition results that are generated from the trained object recognition neural network, the XR system can enable multiple applications and can improve immersive experiences in the applications. Users of the XR system or application developers can place XR contents or applications in the physical world with one or more objects that have been recognized in the scene of the environment. For example, a game application can set a virtual object (e.g., a cup of coffee) on top of a real world coffee table that has been recognized in the passable world model.

By making use of the described techniques, an XR application can have more immersive experiences. For example, a virtual assistant of an interactive game application can sit on one of the chairs that have been recognized in the passable world model in order to provide a more immersive experience. As another example, an application can use detected objects such as tables and sofas to design specific environments for a more immersive experience.

In some implementations, the XR system can build a spatial knowledge graph of objects based on the passable world model that includes locations of the detected objects. In some implementations, the XR system can perform more robustly by making use of the location information of the detected objects. For example, tracking, localization or meshing computations can be more robust to long term dynamic changes, such as moving objects, by making use of the object detections. As another example, by recognizing TV screens and/or picture frames in the environment, the XR system can use the object recognition results of the TV screens and/or the picture frames as virtual screens that can blend in seamlessly with the real world.

The foregoing summary is provided by way of illustration and is not intended to be limiting.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Described herein are methods and apparatus for training an object recognition neural network using multiple data sources. The object recognition neural network can be used in an X reality (cross reality or XR) system to generate object recognition output from an input image. To provide realistic XR experiences to multiple users, an XR system must know the users' physical surroundings in order to correctly correlate locations of virtual objects in relation to real objects. An XR system may build an environment map of a scene, which may be created from image and/or depth information collected with sensors that are part of XR devices worn by users of the XR system. The environment map of a scene can include data specifying the real objects in the scene which can be obtained through the scalable 3-D object recognition.

Figure 1:
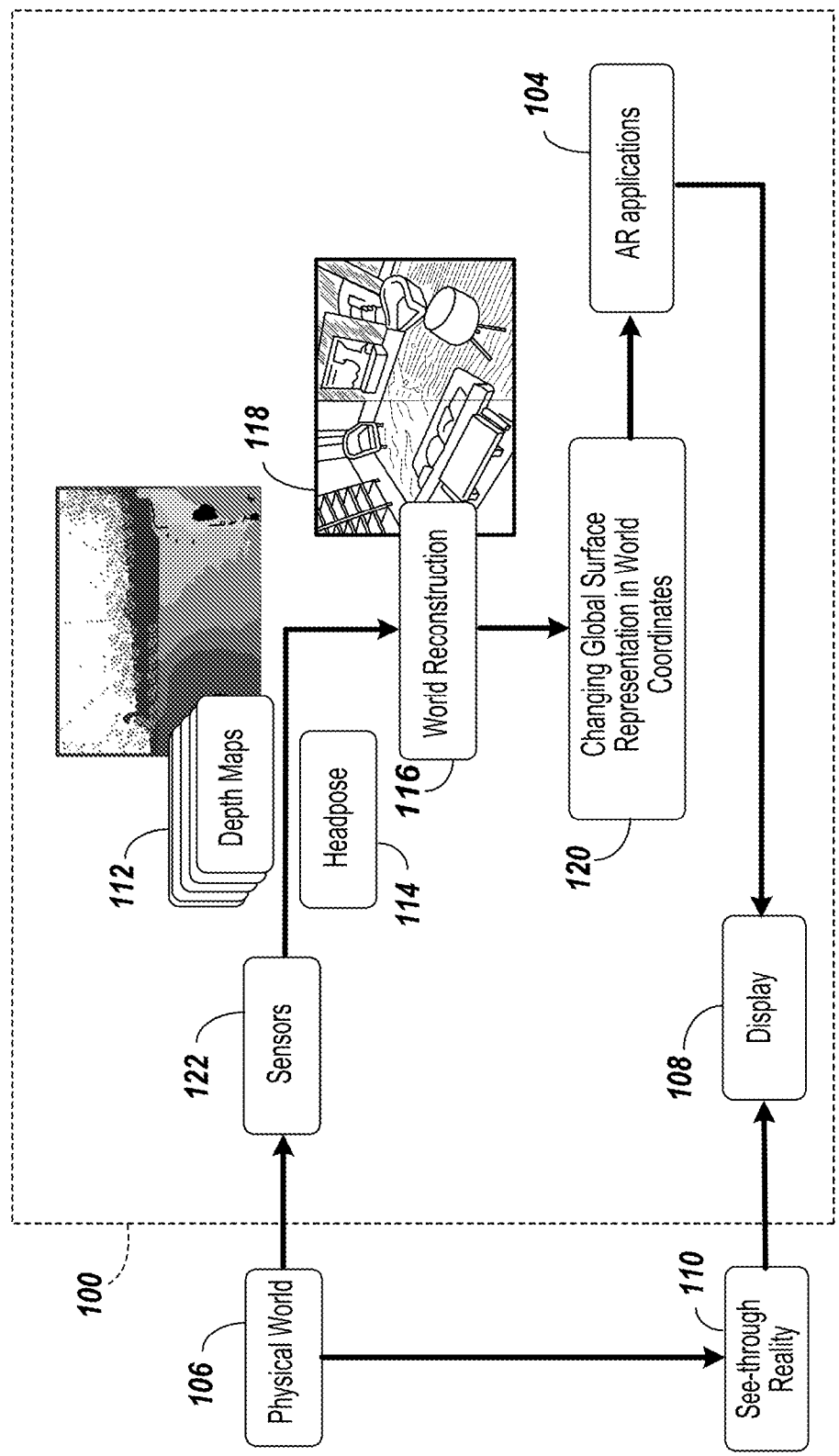
FIG. 1 is a schematic diagram illustrating data flow in an AR system configured to provide an experience to the user of AR content interacting with a physical world.

FIG. 1 depicts an AR system 100 configured to provide an experience of AR contents interacting with a physical world 106, according to some embodiments. The AR system 100 may include a display 108. In the illustrated embodiment, the display 108 may be worn by the user as part of a headset such that a user may wear the display over their eyes like a pair of goggles or glasses. At least a portion of the display may be transparent such that a user may observe a see-through reality 110. The see-through reality 110 may correspond to portions of the physical world 106 that are within a present viewpoint (e.g. field of view) of the AR system 100, which may correspond to the viewpoint of the user in the case that the user is wearing a headset incorporating both the display and sensors of the AR system to acquire information about the physical world.

AR contents may also be presented on the display 108, overlaid on the see-through reality 110. To provide accurate interactions between AR contents and the see-through reality 110 on the display 108, the AR system 100 may include sensors 122 configured to capture information about the physical world 106.

The sensors 122 may include one or more depth sensors that output depth maps 112. In some embodiments, one or more depth sensors may output depth data that may be converted into depth maps by a different system or by one or more different components of the XR system. Each depth map 112 may have multiple pixels, each of which may represent a distance to a surface in the physical world 106 in a particular direction relative to the depth sensor. Raw depth data may come from a depth sensor to create a depth map. Such depth maps may be updated as fast as the depth sensor can form a new image, which may be hundreds or thousands of times per second. However, that data may be noisy and incomplete, and have holes shown as black pixels on the illustrated depth map.

The system may include other sensors, such as image sensors. The image sensors may acquire monocular or stereoscopic information that may be processed to represent the physical world in other ways. For example, the images may be processed in world reconstruction component 116 to create a mesh, representing all or portions of objects in the physical world. Metadata about such objects, including for example, color and surface texture, may similarly be acquired with the sensors and stored as part of the world reconstruction.

The system may also acquire information about the head pose (or "pose") of the user with respect to the physical world. In some embodiments, a head pose tracking component of the system may be used to compute head poses in real time. The head pose tracking component may represent a head pose of a user in a coordinate frame with six degrees of freedom including, for example, translation in three perpendicular axes (e.g., forward/backward, up/down, left/right) and rotation about the three perpendicular axes (e.g., pitch, yaw, and roll). In some embodiments, sensors 122 may include inertial measurement units that may be used to compute and/or determine a head pose 114. A head pose 114 for a camera image may indicate a present viewpoint of a sensor capturing the camera image with six degrees of freedom, for example, but the head pose 114 may be used for other purposes, such as to relate image information to a particular portion of the physical world or to relate the position of the display worn on the user's head to the physical world.

In some embodiments, the AR device may construct a map from the feature points recognized in successive images in a series of image frames captured as a user moves throughout the physical world with the AR device. Though each image frame may be taken from a different pose as the user moves, the system may adjust the orientation of the features of each successive image frame to match the orientation of the initial image frame by matching features of the successive image frames to previously captured image frames. Translations of the successive image frames so that points representing the same features will match corresponding feature points from previously collected image frames, can be used to align each successive image frame to match the orientation of previously processed image frames. The frames in the resulting map may have a common orientation established when the first image frame was added to the map. This map, with sets of feature points in a common frame of reference, may be used to determine the user's pose within the physical world by matching features from current image frames to the map. In some embodiments, this map may be called a tracking map.

In addition to enabling tracking of the user's pose within the environment, this map may enable other components of the system, such as world reconstruction component 116, to determine the location of physical objects with respect to the user. The world reconstruction component 116 may receive the depth maps 112 and head poses 114, and any other data from the sensors, and integrate that data into a reconstruction 118. The reconstruction 118 may be more complete and less noisy than the sensor data. The world reconstruction component 116 may update the reconstruction 118 using spatial and temporal averaging of the sensor data from multiple viewpoints over time.

The reconstruction 118 may include representations of the physical world in one or more data formats including, for example, voxels, meshes, planes, etc. The different formats may represent alternative representations of the same portions of the physical world or may represent different portions of the physical world. In the illustrated example, on the left side of the reconstruction 118, portions of the physical world are presented as a global surface; on the right side of the reconstruction 118, portions of the physical world are presented as meshes.

In some embodiments, the map maintained by head pose component 114 may be sparse relative to other maps that might be maintained of the physical world. Rather than providing information about locations, and possibly other characteristics, of surfaces, the sparse map may indicate locations of interest points and/or structures, such as corners or edges. In some embodiments, the map may include image frames as captured by the sensors 122. These frames may be reduced to features, which may represent the interest points and/or structures. In conjunction with each frame, information about a pose of a user from which the frame was acquired may also be stored as part of the map. In some embodiments, every image acquired by the sensor may or may not be stored. In some embodiments, the system may process images as they are collected by sensors and select subsets of the image frames for further computation. The selection may be based on one or more criteria that limits the addition of information yet ensures that the map contains useful information. The system may add a new image frame to the map, for example, based on overlap with a prior image frame already added to the map or based on the image frame containing a sufficient number of features determined as likely to represent stationary objects. In some embodiments, the selected image frames, or groups of features from selected image frames may serve as key frames for the map, which are used to provide spatial information.

The AR system 100 may integrate sensor data over time from multiple viewpoints of a physical world. The poses of the sensors (e.g., position and orientation) may be tracked as a device including the sensors is moved. As the sensor's frame pose is known and how it relates to the other poses, each of these multiple viewpoints of the physical world may be fused together into a single, combined reconstruction of the physical world, which may serve as an abstract layer for the map and provide spatial information. The reconstruction may be more complete and less noisy than the original sensor data by using spatial and temporal averaging (i.e. averaging data from multiple viewpoints over time), or any other suitable method.

In the illustrated embodiment in FIG. 1, a map (e.g. a tracking map) represents the portion of the physical world in which a user of a single, wearable device is present. In that scenario, head pose associated with frames in the map may be represented as a local head pose, indicating orientation relative to an initial orientation for a single device at the start of a session. For example, the head pose may be tracked relative to an initial head pose when the device was turned on or otherwise operated to scan an environment to build a representation of that environment.

In combination with content characterizing that portion of the physical world, the map may include metadata. The metadata, for example, may indicate time of capture of the sensor information used to form the map. Metadata alternatively or additionally may indicate location of the sensors at the time of capture of information used to form the map. Location may be expressed directly, such as with information from a GPS chip, or indirectly, such as with a Wi-Fi signature indicating strength of signals received from one or more wireless access points while the sensor data was being collected and/or with the BSSIDs of wireless access points to which the user device connected while the sensor data was collected.

The reconstruction 118 may be used for AR functions, such as producing a surface representation of the physical world for occlusion processing or physics-based processing. This surface representation may change as the user moves or objects in the physical world change. Aspects of the reconstruction 118 may be used, for example, by a component 120 that produces a changing global surface representation in world coordinates, which may be used by other components.

The AR content may be generated based on this information, such as by AR applications 104. An AR application 104 may be a game program, for example, that performs one or more functions based on information about the physical world, such as visual occlusion, physics-based interactions, and environment reasoning. It may perform these functions by querying data in different formats from the reconstruction 118 produced by the world reconstruction component 116. In some embodiments, component 120 may be configured to output updates when a representation in a region of interest of the physical world changes. That region of interest, for example, may be set to approximate to a portion of the physical world in the vicinity of the user of the system, such as the portion within the view field of the user, or is projected (predicted/determined) to come within the view field of the user.

The AR applications 104 may use this information to generate and update the AR contents. The virtual portion of the AR contents may be presented on the display 108 in combination with the see-through reality 110, creating a realistic user experience.

Figure 2:
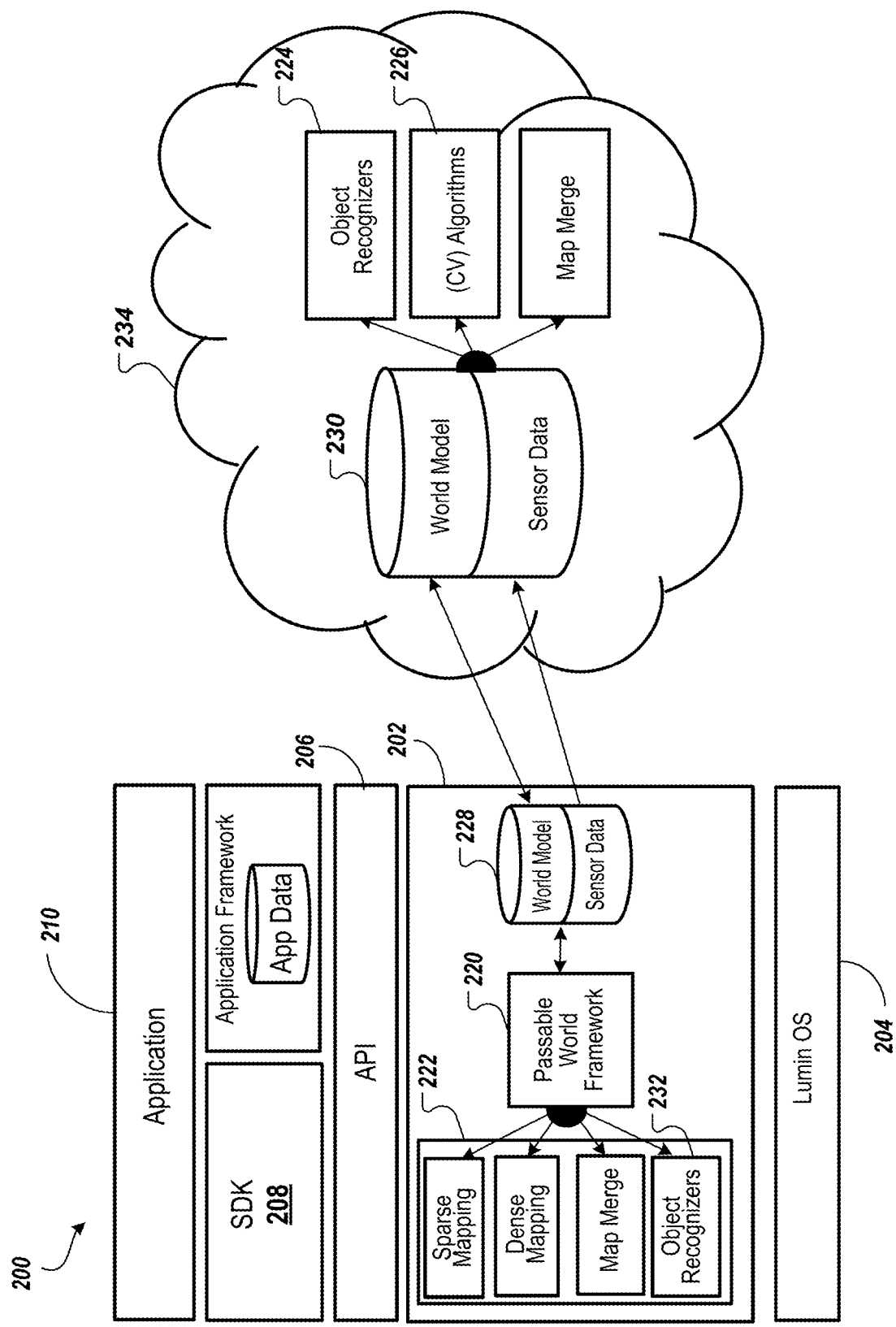
FIG. 2 is a schematic diagram illustrating components of an AR system that maintain a model of a passable world.

FIG. 2 is a schematic diagram illustrating components of an AR system 200 that maintain a passable world model. The passable world model is a digital representation of the real objects in the physical world. The passable world model can be stored and updated with changes to the real objects in the physical world. The passable world model can be stored in storage systems in combination with images, features, directional audio inputs, or other desired data. The passable world model can be used to generate the reconstruction 118 by the world reconstruction component 116 in FIG. 1.

In some implementations, a passable world model may be represented in a way that may be readily shared among users and among the distributed components, including applications. Information about the physical world, for example, may be represented as persistent coordinate frames (PCFs). A PCF may be defined based on one or more points that represent features recognized in the physical world. The features may be selected such that they are likely to be the same from user session to user session of the XR system. PCFs may be defined sparsely based on one or more points in the space (e.g., corners, edges), providing less than all of the available information about the physical world, such that they may be efficiently processed and transferred. A PCF may comprise six degrees of freedom with translations and rotations relative to a map coordinate system.

The AR system 200 may include a passable world component 202, an operating system (OS) 204, API's 206, SDK 208, and Application 210. The OS 204 may include a Linux-based kernel with custom drivers compatible with an AR device, e.g., a Lumin OS. The API's 206 may include application programming interfaces that grant AR applications (e.g., Applications 210) access to the spatial computing features of an AR device. The SDK 208 may include a software development kit that allows the creation of AR applications.

The passable world component 202 can create and maintain a passable world model. In this example sensor data is collected on a local device. Processing of that sensor data may be performed in part locally on the XR device and partially in the cloud. In some embodiments, processing of that sensor data may be performed only on the XR device, or only in the cloud. The passable world model may include environment maps created based, at least in part, on data captured by AR devices worn by multiple users.

The passable world component 202 includes a passable world framework (FW) 220, storage system 228, and a plurality of spatial computation components 222.

The passable world framework 220 can include computer-implemented algorithms programmed to create and maintain the model of the passable world. The passable world framework 220 stores the passable world model in a storage system 228. For example, the passable world framework can store a current passable world model and sensor data in the storage system 228. The passable world framework 220 creates and updates the passable world model by calling the spatial computation components 222. For example, the passable world framework can obtain bounding boxes of the objects in a scene by triggering the object recognizers 232 to perform object recognition.

The spatial computation components 222 include a plurality of components that can perform computation in the 3-D space of a scene. For example, the spatial computation components 222 can include an object recognition system (also called "object recognizers") 232, sparse mapping system, dense mapping system and map merge systems, etc. The spatial computation components 222 can generate outputs that can be used to create or update the passable world model. For example, the object recognition system can generate output data that specifies one or more bounding boxes of one or more objects that have been recognized in a stream of images captured by sensors of an AR device.

The storage system 228 can store the passable world model and sensor data acquired from multiple AR devices in one or more databases. The storage system can provide sensor data and an existing passable world model, e.g., objects that have been recognized in the scene, to the algorithms in the passable world FW 220. After computing an updated passable world model based on newly acquired sensor data, the storage system 228 can receive the updated passable world model from the passable world FW 220 and store the updated passable world model in the databases.

In some implementations, part or all components of the passable world component 202 can be implemented in a plurality of computers or computer systems in a cloud computing environment 234. The cloud computing environment 234 has distributed scalable computation resources that can be physically located at a location different from the location of the AR system 200. The plurality of computers or computer systems in the cloud computing environment 234 can provide a flexible amount of storage and computation capabilities. Using the cloud computing environment, the AR system 200 can provide scalable AR Applications 210 that involves multiple user devices, and/or an environment that includes a large amount of physical objects.

In some implementations, a cloud storage system 230 can store the world model and the sensor data. The cloud storage system 230 can have scalable storage capacity and can adapt to various amounts of storage needs. For example, the cloud storage system 230 can receive recently captured sensor data from a local storage system 228. As more and more sensor data is captured by sensors of an AR device, the cloud storage system 230 that has large storage capacity can accommodate the recently captured sensor data. The cloud storage system 230 and the local storage system 228 can store the same world model. In some implementations, a complete world model of an environment can be stored on the cloud storage system 230, while a part of the passable world model that is pertinent to the current AR Application 210 can be stored on the local storage system 228.

In some implementations, some of the spatial computation components 222 can be executed in the cloud computing environment 234. For example, object recognizers 224, computer vision algorithms 226, map merge and many other kinds of spatial computation components can be implemented and executed in the cloud. The cloud computing environment 234 can provide more scalable and more powerful computers and computer systems to support the computation needs of these spatial computation components. For example, an object recognizer may include a deep convolutional neural network (DNN) model that requires heavy computation using graphical computation units (GPUs) or other hardware accelerators and a large amount of runtime memory to store the DNN model. The cloud computing environment can support this kind of requirement of the object recognizer.

In some implementations, the spatial computation components, e.g., object recognizers, can perform computation in the cloud while using the sensor data and existing world model that are stored in the cloud storage system 230. In some implementations, the spatial computation and the cloud storage can exist in the same cloud computer system in order to enable efficient computation in the cloud. The cloud computation results, e.g., object recognition results, can be further processed and then stored as an updated passable world model in the cloud storage system 230.

The object recognition system (also called "object recognizers") 224 can generate 3-D object recognition outputs for multiple 3-D objects in a scene of the environment using an object recognition algorithm. In some implementations, the object recognition system 224 can generate a 2-D object recognition output from input sensor data using a 2-D object recognition algorithm. Then the object recognition system 224 can generate a 3-D object recognition output based on the 2-D object recognition output.

The object recognition algorithm can be a machine learning algorithm, including an object recognition neural network. The object recognition neural network can be trained to generate object recognition output from input sensor data, such as an input image. Training the object recognition neural network includes using an optimization algorithm to find a set of parameters of the neural network that can best map the training images to the desired outputs based on the ground-truth annotations in training data.

The training process can be performed by a neural network training system. The neural network training system can implement the operations of each layer of the object recognition neural network that is designed to make object recognition predictions from an input image. The training system includes a plurality of computing devices having software or hardware modules that implement the respective operations of each layer of the neural network according to an architecture of the neural network. For example, the cloud computing environment 234 can provide one or more computing devices having software or hardware modules that implement the respective operations of each layer of an object recognition neural network according to an architecture of the neural network. The training system can receive training data that include labeled training images, including the ground-truth annotations. The training system can iteratively generate updated model parameters of the object recognition neural network.

After training is complete, the training system can provide a final set of model parameter values to the AR system 200 for use in making object recognition predictions, e.g., predicting 2-D object bounding boxes. The final set of model parameter values can be stored in the cloud storage system 230 in the cloud computing environment 234 of the AR system 200.

The training examples can include a plurality of training images and a respective ground-truth annotation for each training image. The plurality of training images can include images from two or more sources, e.g., real-world images, and synthetic images, etc. The real-world images can include images generated from one or more camera sensors of an AR device. The synthetic images can be generated by computer programs, e.g., from the real-world images, and can be used to increase the total amount of training examples. Examples of synthetic images can include simulated images generated from a known passable world model of an environment, or synthetic images with image patches of real or synthetic objects overlaid on top of a background image, etc. In some implementations, the ground-truth annotations for the synthetic images can be automatically generated, which can be more efficient than generating the ground-truth annotations for the real-world images in which manual labeling can be required.

Training images from different sources can have different appearance and different inherent characteristics. For example, the images from a first source can include a wider range of colors than the images from a second source. As another example, camera images of a living room can have a different appearance than a synthetic image generated from a passable world model of the living room. An object recognition neural network can be trained with training data from multiple data sources, e.g., real-world images and synthetic images, by applying contrast equalization to the training data. More details of training an object recognition neural network by applying contrast equalization to the training data are described in connection with FIG. 3.

In some implementations, the training data can include annotations of objects that belong to different object categories. At each iteration, a set of training images, i.e., a batch of training images, can be obtained from the training data. The set of training images can include imbalanced object categories. For example, the set of training images can include a small number of bookcases and a large number of chairs. For each training image in the set of training images, a weight can be determined based on the statistics of object category annotations in the set of training images. The object recognition neural network can be trained with a set of training images that include imbalanced object categories by calculating a weighted loss based on the weight for each training image in the set of training images. More details of training an object recognition neural network using training images with imbalanced object categories are described in connection with FIG. 4.

In some implementations, the set of training images can be selected from the training data using various data filtering strategies. The data filtering strategies can include selecting or discarding one or more images during the training of the object recognition neural network, i.e., online data filtering, or on-the-fly data filtering. For example, one or more images that have motion blur, one or more of the images that depict objects that do not belong to a relevant object category, or one or more images that depict an object that is truncated or occluded can be discarded. Using online data filtering, the training system can train multiple object recognition neural networks that have different categories of interest using the same training data, without a need for re-labeling the training data for the training of each object recognition neural network. More details of online data filtering are described in connection with FIG. 4.

The 2-D object recognition output generated by the object recognition system 224 can include a bounding box and a localization score, or an instance mask and a mask score of one or more objects recognized in the input image. The 2-D bounding box of the object is an estimated rectangular box that tightly surrounds the object recognized in the input image. The output of object recognition system 224 can include values that define location of the estimated bounding box, e.g., values that define the positions of vertices of the estimated bounding box. The 2-D instance mask can locate each pixel of the object recognized in the input image and can treat multiple objects of the same class as distinct individual objects, e.g., instances. The output of the object recognition system 224 can include values that define locations of the estimated 2-D instance mask.

Optionally, the 2-D object recognition output can further include an object category output. The object category output of a recognized object in an input image can include a respective probability for each of a plurality of object classes that represents a likelihood that the recognized object belongs to the object class.

The localization score is a prediction of an intersection-over-union overlap between a predicted object bounding box and a ground-truth object bounding box. The mask score is a prediction of an intersection-over-union overlap between a predicted object mask and a ground-truth object mask. Intersection-over-union (IoU) is an evaluation metric for object recognition tasks, such as an object detection task and an object segmentation task. For example, an intersection-over-union value can evaluate how well a predicted bounding box matches a ground-truth annotation of the object bounding box.

At inference time, the ground-truth annotation of a bounding box or the ground-truth annotation of an instance mask of an object in an input image may not be available. The object recognition neural network can be trained to generate a localization score along with a predicted bounding box, or a mask score along with a predicted instance mask. The localization score or the mask score can be a confidence score indicating the accuracy of the predicted object bounding box or the predicted object mask. More details of an object recognition neural network that predicts a localization score or a mask score of one or more objects captured in the input image are described in connection with FIG. 5.

Figure 3:
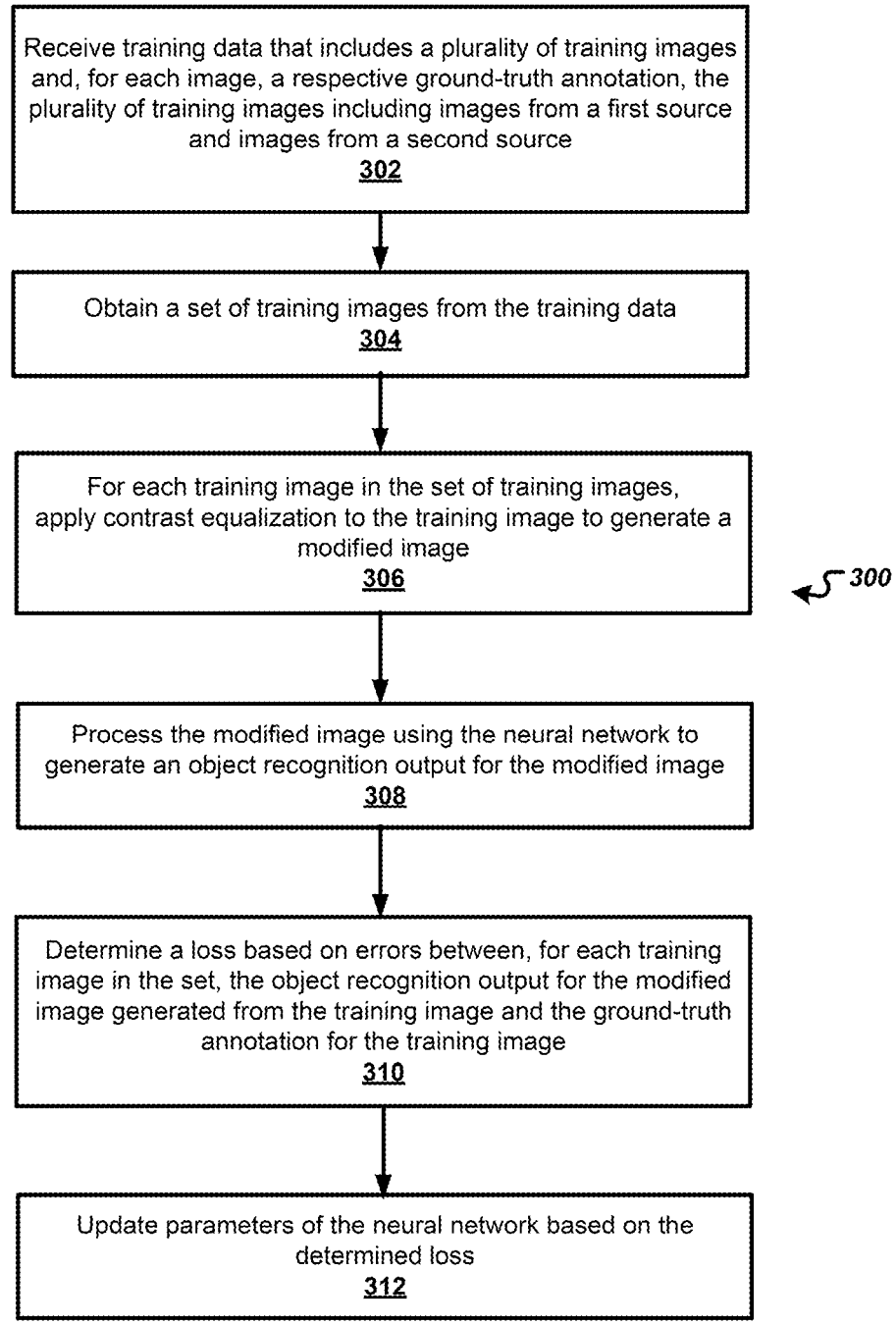
FIG. 3 is a flow chart of an example process for training an object recognition neural network using multiple data sources.

FIG. 3 is a flow chart of an example process 300 for training an object recognition neural network using multiple data sources. The process 300 will be described as being performed by an appropriately programmed neural network training system. The system trains the neural network by applying contrast equalization to training images from two or more sources. Using modified images generated by contrast equalization that have similar appearance and similar pixel intensity distributions, the neural network can be trained to achieve best results for images from both sources.

For example, the multiple sources can include real-world image sources and synthetic image sources. The object recognition neural network can be trained for deployment for processing real-world images captured by an AR system. In this example, using contrast equalization during training, the neural network can have good performance on real-world images even though it is trained on a mix of real-world images and synthetic images.

The system receives training data that includes a plurality of training images and, for each image, a respective ground-truth annotation (302). The plurality of training images include images from a first source and images from a second source.

Each training image in the plurality of training images can be a 2-D color image, or a 2-D grayscale image. The 2-D color image can be an RGB image depicting colors of one or more objects and colors of their surrounding environment in the physical world.

For each training image, the training data includes a respective ground-truth annotation that depicts the one or more objects in the training image. The ground-truth annotation can include data that depicts an object category, an object bounding-box, an object mask, etc. An object category annotation can include a value, e.g., an integer, which depicts an object category information that belongs to one of the predetermined categories of objects of interest, such as chair, table, sofa, TV, poster, etc. An object bounding box annotation can include data that defines a tight fitting rectangle around the visible portion of the object. In some implementations, an object bounding box annotation can include a three-dimensional (3-D) bounding box annotation, or a two-dimensional (2-D) bounding box annotation for an object in the training image, or both. An instance mask annotation can include a tight binary mask, e.g., each pixel with a value of "1" corresponds to a visible portion of the object, and each pixel with a value of "0" corresponds to the background.

The ground-truth annotation of the training images can be obtained through manual labeling by humans, which can be time-consuming. Alternatively, or in combination, computerized tools or algorithms can be used to generate annotations automatically or as an assistant to human labelers.

The plurality of training images can include images from two or more different sources, such as images from a first source and images from a second source. In some implementations, the first source can be a set of real-world images and the second source can be a set of synthetic images. The real-world images can be captured by a camera of an AR device. The synthetic images can be generated from a computer software with computer algorithms, or manually generated by humans, or a combination of both, etc. The synthetic images can be used in addition to the real-world image to increase a total number of training images in the training data. In some implementations, the ground-truth annotations for the synthetic images can be obtained more efficiently than the ground-truth annotations for the real-world images because the computer program can be instructed to generate images of a particular type.

In some implementations, a synthetic image can be generated from one or more real-world images or a model of the environment. In some implementations, a synthetic image can be a simulated image generated from a known passable world model of an environment at a predetermined simulated camera pose. A camera pose data can define the pose of the camera along six degrees of freedom (6DOF), e.g., forward and backward, up and down, left and right relative to a coordinate system of the surrounding environment. For example, from a 3-D passable world model of a living room, a plurality of simulated images can be generated that correspond to a plurality of camera poses in a living room. Known 3-D bounding boxes or 3-D masks in the passable world model can be used to generate corresponding ground-truth annotations of 2-D bounding boxes or 2-D masks of the objects in the synthetic image.

In some implementations, a synthetic image can be generated by overlaying one or more images of one or more objects onto a background image. For example, in order to have a particular type of chair, e.g., a computer chair, in a training image, a synthetic image can be generated by placing the particular type of chair, e.g., a computer chair, in a background image, e.g., an image that captures an environment of an empty office space. The ground-truth annotation of the object category of the computer chair in the synthetic image can be automatically labeled as "computer chair".

The system obtains a set of training images from the training data (304). In some implementations, the system can sample an initial set of images from the training data, and the system can generate a set of training images by discarding one or more training images from the initial set. In some implementations, the system can select or discard one or more images during the training of the object recognition neural network, i.e., online data filtering, or on-the-fly data filtering. More details of generating the set of training images are described in connection with FIG. 4.

For each training image in the set of training images, the system applies contrast equalization to the training image to generate a modified image (306). Training images from different sources can have different appearance and different pixel intensity distributions. For example, the images from a first source can be overexposed and the images from a second source can be underexposed. As another example, a camera image of a living room captured at a camera pose can be darker than a synthetic image generated from a passable world model of the living room. When training an object neural network using training images from two or more sources, the system may determine to achieve best results on one source of the images, e.g., the real-world images.

The system can apply contrast equalization to each training image to generate a modified image, resulting in modified images from different sources having similar appearance. In image processing, a contrast level of an image is the amount of color or grayscale differentiation that exists between various image features. Images having a higher contrast level generally display a greater degree of color or grayscale variation than those of lower contrast. Contrast equalization is an image enhancement method that can equalize the variations in the color space, or in the grayscale space. For example, contrast equalization may increase the contrast level of many images and improve quality of images. An example contrast equalization method can be histogram equalization, which is applied to a histogram of the pixel values of an image, and can spread out the most frequent intensive values in an image. For example, contrast Equalization can reduce the appearance gap between the real images and the synthetic images by ensuring that the color variations in both domains are similar. Instead of trying to make a synthetic image look real, which can be a difficult graphics problem, the contrast equalization method can move both the real images and the synthetic images into a common color space via a pre-processing step.

The system can apply contrast equalization to the training images from different sources, e.g., real-world images and synthetic images, to generate modified images. The modified images from different sources can have similar appearance and similar pixel intensity distributions, e.g., equalized variations in the color space. By applying contrast equalization, the system can handle the domain gap between training images from different sources effectively and efficiently, instead of relying on complicated domain adaptation neural network algorithms or complicated domain adaptation systems.

The system processes the modified image using the neural network to generate an object recognition output for the modified image (308). The object recognition output depicts one or more objects that have been recognized in the modified image. In a multi-task object recognition neural network, the object recognition output can include: object category output, object bounding box, object localization score, object instance mask, and mask score, etc.

For each training image in the set, the system determines a loss based on errors between the object recognition output for the modified image generated from the training image and the ground-truth annotation for the training image (310). The system can compare the object recognition output to the ground truth annotations of the one or more objects in the set of training images. In a multi-task object recognition neural network, a total loss can be determined based on a plurality of losses, e.g., object category classification loss, object detection loss, object segmentation loss, etc. For example, an object category classification loss, e.g., cross-entropy loss, can measure the differences between the predicted object category output and the object category label. An object detection loss, e.g., L1 loss, L2 loss, smooth L1 loss, etc., can measure location differences between the predicted locations of the vertices of the 2-D bounding box and the corresponding ground truth label. An object segmentation loss, e.g., the average binary cross-entropy loss over all the pixels in the image, can measure segmentation differences between the predicted object instance mask and the ground truth mask. The system can generate a total loss which can be a weighted sum of one or more of the following: the object category classification loss, the object detection loss, the object segmentation loss, etc.

The system updates parameters of the neural network based on the determined loss (312). In some implementations, the system can generate updated parameters of the object recognition neural network based on a total loss in the case of a multi-task object recognition neural network. The system can generate updated model parameter values of the neural network using an appropriate updating technique, e.g., stochastic gradient descent with backpropagation. The system can then update parameters of the neural network using the updated model parameter values.

Figure 4:
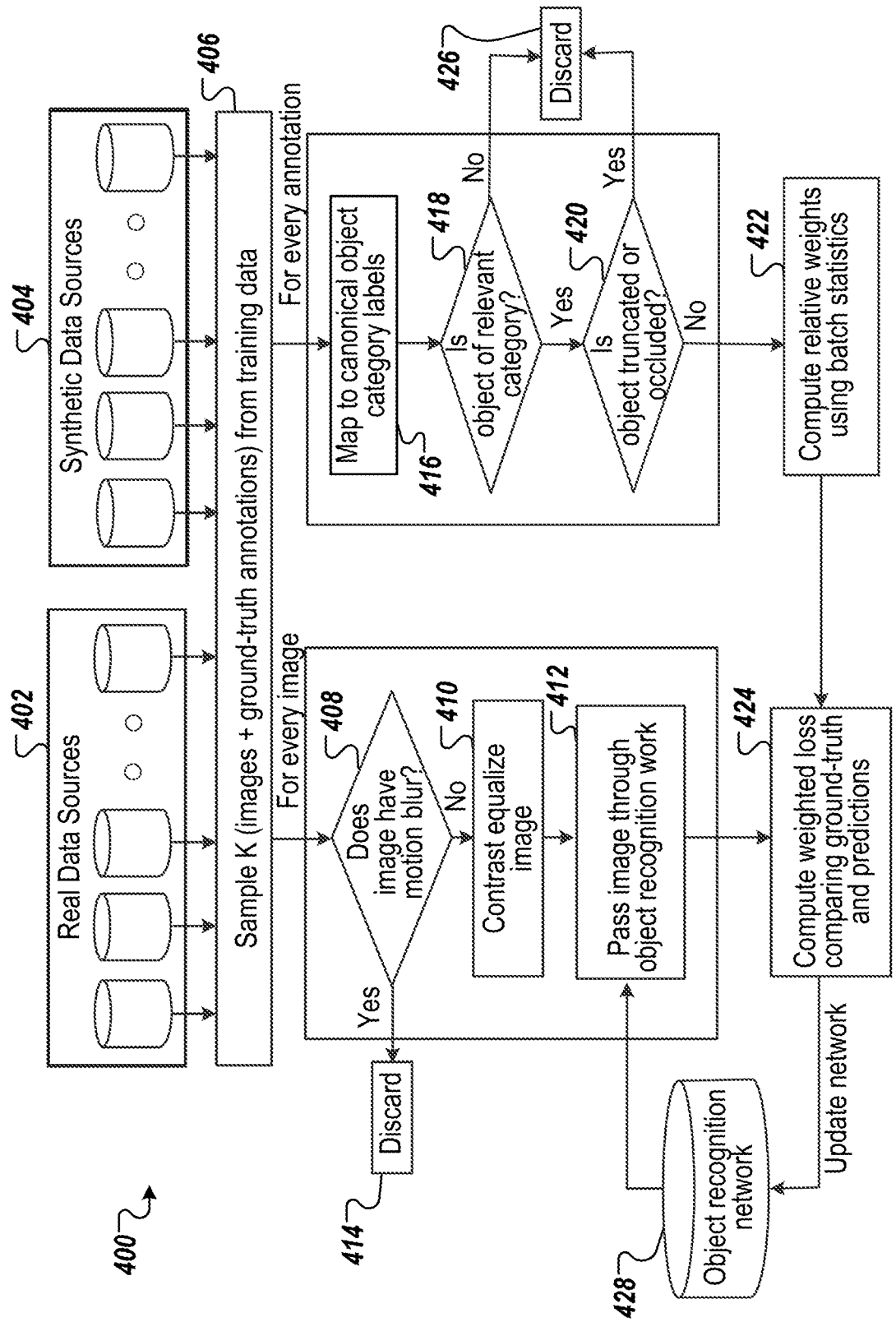
FIG. 4 is a schematic diagram illustrating selecting a set of training images from the training data and computing weighted loss based on object category statistics.

FIG. 4 is a schematic diagram illustrating selecting a set of training images from the training data and computing weighted loss based on object category statistics. The training data can include multiple sources, e.g., real-world data sources 402 and synthetic data sources 404. Each data source can include a plurality of training images from that data source. Each training image in the training data can correspond to a ground-truth annotation. For example, each training image can depict one or more objects in a home or an office environment, and each training image can correspond to a ground-truth annotation for the objects in the training image.

The system can train the object recognition neural network in iterations. At each iteration, the system trains the object recognition neural network with a set of training images, i.e., a batch of training images. At each iteration, an initial set of images and their corresponding ground-truth annotations are sampled 406 from the training data. The system can sample from different data sources, e.g., real-world data sources 402, and synthetic data sources 404, with pre-defined sampling ratios. For example, the sampling ratio between real-world images and synthetic images can be 10:1.

A set of training images are generated by selecting or discarding one or more training images from the initial set. The set of training images with selected images and ground-truth annotations can be used to train neural network models that can process images with different properties and can recognize special types of objects.

In some implementations, for every image in the initial set of images, the system can determine 408 whether the image has motion blur. In response to determining that the image has motion blur, the system can discard 414 the image that has motion blur. Fast movement of a person wearing an AR device can cause motion blur in the images generated from one or more camera sensors of the AR device. The system can train an object recognition neural network that is specialized for processing stable images without motion blur by discarding the training images in the initial set that have motion blur. In some implementations, an object recognition neural network that is specialized for processing images with motion blur can be trained with a set of training images with motion blur.

In some implementations, from the ground-truth annotations for the training images in the initial set of images, the system can determine 418 that one or more of the images in the initial set of images depict objects that do not belong to a relevant object category. In response, the system can discard 426 the one or more images that depict objects that do not belong to a relevant object category. For example, the system can train a specialized object recognition neural network that can only recognize different kinds of furniture, e.g., chair, table, sofa, etc. The system can discard an image that only depicts an object that is not a furniture, e.g., a toy, or a pet, etc.

In some implementations, before determining that the one or more of the images in the initial set of images depict objects that do not belong to a relevant object category, the system can map 416 the ground-truth annotations for images from different data sources to canonical object category labels, i.e., consistent object category labels. The system can therefore combine annotations from different data sources in a consistent manner. The system can perform the object category mapping during the training of the neural network, i.e., on-the-fly, instead of performing a pre-processing before training. Therefore, the system can train multiple neural network models with different categories of interest or groups of categories easily instead of re-labeling the data for the training of each neural network model.

For example, a first data source and a second data source may use inconsistent label names for the same type of objects. A first data source may have labeled sofa as "sofa" with a category index of ID3, and a second data source may have labeled sofa as "couch" with a category index of ID10. The system can define a category called "a sofa kind", which can include objects such as sofas, couches, loveseats, recliners, and many different furniture that look like a sofa, etc. The system can create a single index, e.g., ID500, for the category "a sofa kind". The category "a sofa kind" can group multiple similar categories together and can include a list of all of those category indexes from different data sources, e.g., the category index ID500={ID3, ID10}. Therefore, the category index ID3 from the first dataset and the category index ID10 from the second dataset are both mapped to the same category index ID500, "a sofa kind".

In some implementations, the system can determine 420 that one or more of the images in the initial set of images depict an object that is truncated or occluded. In response, the system can discard 426 the one or more images that depict an object that is truncated or occluded. A truncated object is partially captured in the image, with part of the object being outside the image. An occluded object is partially hidden or occluded by another object captured in the image.

In some implementations, the system can obtain, from the ground-truth annotations for the training images in the initial set of images, truncation scores or occlusion scores previously computed based on the ground-truth annotations. A truncation score or an occlusion score can represent a likelihood that the object is truncated or occluded in the image. The system can determine, during the training of the neural network, based on the truncation scores or occlusion scores, that one or more of the images in the initial set of images depict an object that is truncated or occluded. For example, the system can select training image that have object instances with a truncation score or an occlusion score that is within a certain range, i.e., smaller than 0.2, in order to train an object recognition neural network that is specialized for processing clean data, i.e. un-truncated or un-occluded objects.

In some implementations, the system can obtain, from the ground-truth annotations, a 3-D bounding box and a 2-D bounding box for an object in a training image from the initial set of images. The system can generate a projected 2-D bounding box by projecting the 3-D bounding box to the training image, e.g., based on a camera pose of the training image. The system can compute a truncation score or an occlusion score using an overlap between the projected 2-D bounding box and the 2-D bounding box from the ground-truth annotations. For an image that includes multiple objects, the system can compute a truncation score or an occlusion score for each object in the image.

For example, for an input image of a living room, the system can access information of the 3-D bounding boxes and 2-D bounding boxes of objects in the living room, e.g., a sofa, or a chair, etc. Because the system can access information about the whole sofa, the system can project the 3-D bounding box of the sofa to the input image, and compare the overlap of the projected 3-D bounding box and the 2-D bounding box of the sofa. The system can calculate a truncation score of the sofa in the input image, e.g., the truncation score is 0.5. As another example, if the input image includes a dining chair and a dining table that has been occluded by the dining chair, the system can obtain information of the 3-D bounding boxes of the dining table and the dining chair. The system can project the 3-D bounding boxes to the input image, and can calculate the extent of the dining table in the input image and the extent of the dining chair in the input image. The system can calculate the visible portions of the dining table and can calculate an occlusion score of the dining table, e.g., the occlusion score of the dining table is 0.7.

For example, from a 3-D passable world model of a living room, a plurality of simulated images can be generated that corresponds to a plurality of camera poses of a camera that captures an environment of the living room. In one camera pose, the whole couch in the living may be entirely visible in a simulated image. In another camera pose, the simulated image may only include half of the couch. Known 3-D bounding boxes and 2-D bounding boxes of the couch in the passable world model can be used to generate corresponding truncation scores of the couch in the synthetic image.

After generating a set of training images by discarding or selecting one or more training images from the initial set, the system can apply 410 contrast equalization to the training images to generate modified images. The system can process 412 each modified image using the neural network to generate an object recognition output.

The system can determine a loss based on errors between the object recognition output and the ground-truth annotation for the training image. The system can take into consideration the imbalanced ground-truth annotations in the set of training images. In some implementations, the ground-truth annotations may have imbalanced object counts and the number of objects included in the set of training images may not be balanced. For example, the set of training images may include a large number of images of chairs and a very small number of images of bookcases. In order to predict objects of each category with high degree of accuracy, the system may need to balance the number of objects seen in every training batch such that the trained model is not over-fitted to a particular object category.

In some implementations, for each training image in the set, the system can determine a count of images from the set that have a same ground-truth annotation as the training image. The system can determine, based on the count, a weight for the training image. For example, the system can compute 422 relative weights using batch statistics, i.e., distribution information of the object categories in the set of images. The system can generate, from the error between the object recognition output and the ground-truth annotation for the training image, a weighted error based on the weight for the training image. The system can determine 424 a loss (i.e., a weighted loss) based on the weighted errors for the training images in the set of training images.

The system can compute the weighted loss for every batch, i.e., for every set of training images selected from the training data, instead of using fixed weights for every batch during training. Because the object category statistics may be different for every set of training images, the system can balance batch statistics for every set of training images instead of balancing at the training data level.

For example, the set of training images can include objects that belong to K object categories. A ground-truth annotation for the training image can depict an object that belongs to a k-th object category among K object categories. The weight $w_k$ for the training image can be, $$w_k = 1 + 2 * \left(1 - \frac{c_k}{c_{max}}\right), \qquad (1)$$

where $c_k$ is the count of images from the set that has the same ground-truth annotation, e.g., object category label, as the training image, and $c_{max}$ is the maximum value of all values among counts of images $c_i$, i=1, ..., K. By using equation (1), the weight $w_k$ for the training image can be within a range of [1, 3]. The system can avoid generating very large or very small weights in the presence of very low or very high frequency counts of a group of images that belong to the same ground-truth annotation.

The system can update the parameters of the object recognition neural network 428 based on the computed weighted loss. In the next iteration, the system can pass 412 the next batch of training images through the object recognition neural network to determine the next round of updates to the parameters of the object recognition neural network.

Figure 5:
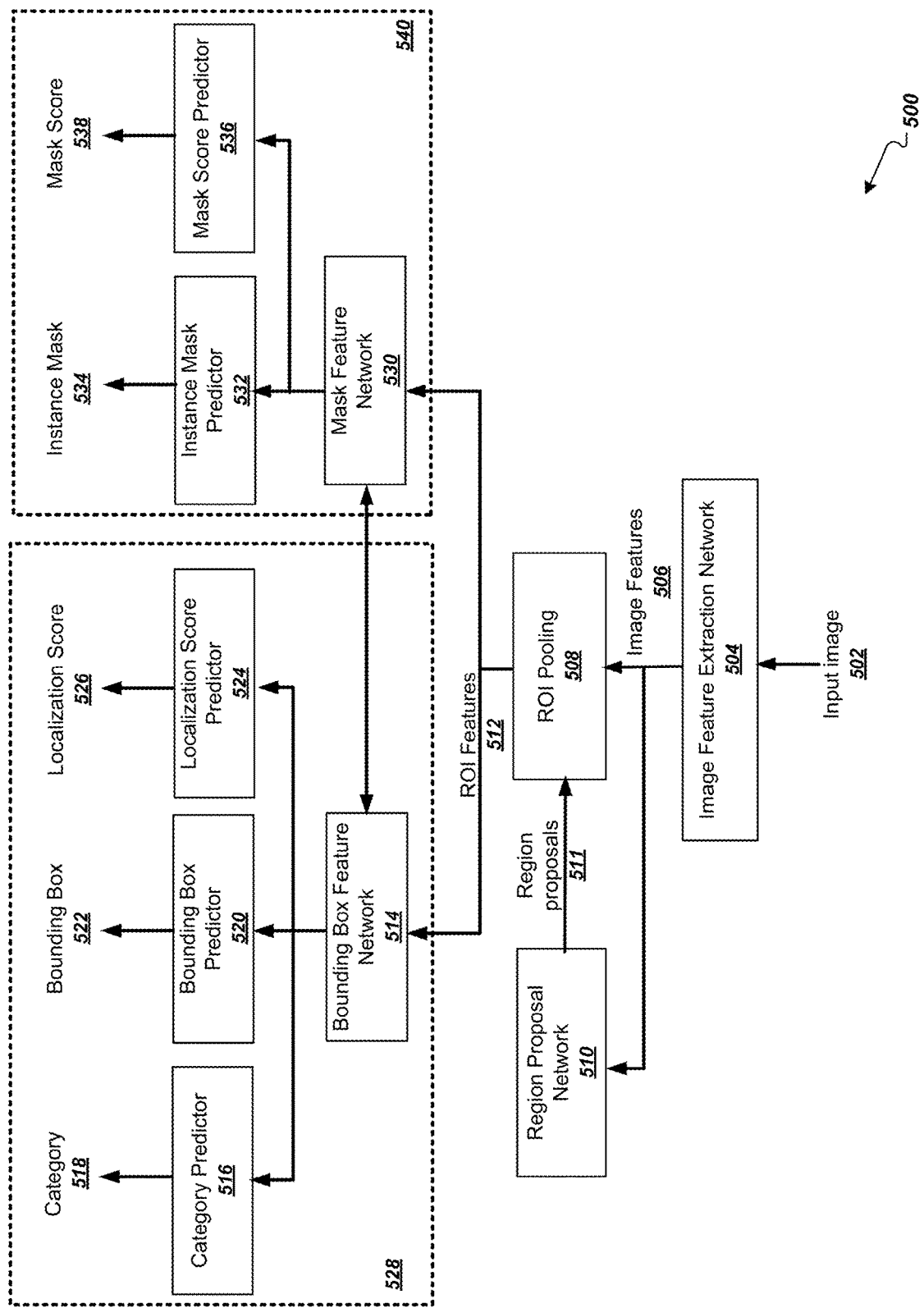
FIG. 5 illustrates an example architecture of an object recognition neural network for predicting a localization score and a mask score from an image.

FIG. 5 illustrates an example architecture of an object recognition neural network 500 for generating an object recognition output from an input image 502. In some implementations, the object recognition output can include a bounding box 522, and a localization score 526 that is a prediction of an intersection-over-union overlap between the bounding box and a ground-truth bounding box. In some implementations, the object recognition output can include an instance mask 534, and a mask score 538 that is a prediction of an intersection-over-union overlap between the instance mask and a ground-truth instance mask.

The localization score 526 can be an estimation of an accuracy of the predicted bounding box 522. The mask score 538 can be an estimation of an accuracy of the predicted instance mask 534. In other words, the localization score can be an indicator of the quality of the prediction of the bounding box, and the mask score can be an indicator of the quality of the prediction of the instance mask.

The object recognition neural network 500 is a convolutional neural network (CNN) that generates an object recognition output, including a predicted value for the localization score 526 and a predicted value for the mask score 538. The neural network 500 is trained to generate the localization score 526 and the mask score 538 by matching the predicted localization score or the predicted mask score with an intersection-over-union (IoU) measurement between a prediction (e.g., the predicted bounding box 522 or the predicted instance mask 534) and the ground truth.

In some implementations, the network 500 implements an object recognition algorithm in a Region Convolutional Neural Network (RCNN) (i.e., a type of CNN) framework (Girshick R, Donahue J, Darrell T, Malik J, "Rich feature hierarchies for accurate object detection and semantic segmentation." Proceedings of the IEEE conference on computer vision and pattern recognition. 2014). The RCNN framework is a family of algorithms to solve 2-D object recognition problems. The RCNN framework can perform object recognition tasks based on regional-of-interest (ROI) features that are computed from region proposals, e.g., proposals of candidate regions that include objects of interest. The object recognition tasks can include an object detection or localization task that generates object bounding boxes, an object classification task that generates object category labels, an object segmentation task that generates object segmentation masks, etc. Examples of object recognition neural networks with the RCNN framework include the Faster RCNN algorithm (Ren, Shaoqing, et al. "Faster R-CNN: Towards real-time object detection with region proposal networks." Advances in neural information processing systems. 2015), the Mask RCNN algorithm (He, Kaiming, et al. "Mask R-CNN." Proceedings of the IEEE international conference on computer vision. 2017.), and many other RCNN based algorithms, etc.

A neural network in the RCNN family can include an image feature extraction network 504, a region proposal network 510, an ROI pooling network 508 and a prediction network. The prediction network can generate final object recognition outputs from ROI features 512. A multi-task RCNN can include a plurality of prediction networks, each of which can perform a different object recognition task. Examples of prediction networks include an object detection network 528, and an instance segmentation network 540, etc.

The network 500 includes an image feature extraction network 504 that takes an input image 502 as input and generates image features 506. Generally, in machine learning and pattern recognition, feature extraction starts from an initial set of measured data and builds derived values, i.e., a set of features, intended to be informative about properties of the input sensor data and non-redundant. The image feature extraction network 504 is a convolutional neural network that includes a number of convolutional layers and optionally, a number of deconvolutional layers. Each convolutional layer and deconvolutional layer has parameters whose values define the filters for the layer.

The network 500 includes a Region Proposal Network (RPN) 510 (Ren, Shaoqing, et al. "Faster R-CNN: Towards real-time object detection with region proposal networks." Advances in neural information processing systems. 2015). The RPN can take image features 506 as input and can generate region proposals 511. Each region proposal can include a predicted object bounding box and a confidence score indicating a likelihood that the predicted object bounding box includes an object that belongs to predetermined object categories. For example, the RPN can take anchors as input, which are fixed-size rectangles defined over the image features 506, and can predict a likelihood that each anchor contains an object and can predict a coordinate offset relative to each anchor that represents the location information of the object detected in each anchor. The RPN 510 can be implemented as one or more convolutional layers and/or fully connected layers.

The network 500 includes a Region-of-interest (ROI) pooling network 508. The ROI pooling network can take (1) image features 506 and (2) region proposals 511 as input, and can generate ROI features 512 for each region proposal 511. For each region proposal, the ROI pooling network can take a portion of the image features 506 which correspond to the region proposal, and can convert the portion of the image features to a fixed dimension feature map, i.e., the ROI features 512. For example, for each region proposal, the input features to the ROI pooling network can be non-uniform because the region proposal can have different sizes. The ROI pooling network can produce fixed-size ROI features, e.g., with dimension 7×7×1024, by performing a pooling operation (e.g., max pooling, average pooling, etc.) on the non-uniform input features. The fixed-size ROI features 512 are ready for use in subsequent prediction networks, e.g., an object detection network 528, and an instance segmentation network 540, etc.

The network 500 can be a multi-task neural network, e.g., a multi-task RCNN that can include a plurality of prediction networks that can perform object recognition tasks. The network 500 can include an object detection network 528, and an instance segmentation network 540.

In some implementations, the network 500 can include an object detection network 528. The object detection network 528 can generate an object detection output that includes data defining a 2-D bounding box 522 for an object in the input image 502, and a localization score 526. The localization score is a prediction of an intersection-over-union overlap between the bounding box and a ground-truth bounding box. Optionally, the object detection network 528 can generate an object category output 518 of the object in the input image.

The object detection network 528 can include a bounding box feature network 514 that can generate bounding box features from the ROI features 512. For each object recognized in the input image, a bounding box predictor 520 can take the bounding box features generated from the bounding box feature network 514 as input and can predict a 2-D bounding box 522 of the object. For each object recognized in the input image, a category predictor 516 can take the bounding box features as input and can generate an object category output 518, i.e., an object class label for the object among a plurality of pre-specified object categories of interest. For each object recognized in the input image, a localization score predictor 524 can take the bounding box features as input and can generate a localization score 526. The object detection network 528 can be implemented as one or more convolutional layers and fully connected layers. The localization score predictor 524 can be implemented as one or more fully connected layers or regression layers, or a combination of both.

In some implementations, the network 500 can include an instance segmentation network 540. The instance segmentation network 540 can generate a 2-D object instance mask 534 that includes data defining pixels that are inside or outside the object, and a mask score 538 that is a prediction of an intersection-over-union overlap between the instance mask and a ground-truth mask.

The instance segmentation network 540 can include a mask feature network 530 that can generate mask features from the ROI features 512. For each object recognized in the input image, an instance mask predictor 532 can take the mask features generated from the mask feature network 530 as input and can generate a 2-D instance mask 534 of the object. For each object recognized in the input image, a mask score predictor 536 can take the mask features generated from the mask feature network 530 as input and can generate a mask score 538. The instance segmentation network 540 can be implemented as one or more convolutional layers. The mask score predictor 538 can be implemented as one or more fully connected layers or regression layers, or a combination of both.

In some implementations, in addition to the ROI features 512, one or more features generated by a bounding box feature network 514 can be used as input to the mask feature network 540 to generate mask features of the ROI. In some implementations, one or more features generated by the mask feature network 530 can be used in an object detection network 528 as well.

The system can store the object recognition output, including the bounding box 522, the localization score 526, the instance mask 534, and the mask score 528, of one or more recognized objects in the storage system 230 in the cloud. The system can also store a copy of the object recognition output in the storage system 228 on the AR device. The system can provide the localization score or the mask score to the passable world component 202 of the AR system. The localization score 526 can be an estimation of an accuracy of the predicted bounding box 522. The mask score 538 can be an estimation of an accuracy of the predicted instance mask 534.

The passable world component 202 can use the object recognition output of the one or more recognized objects to create or to update a passable world model that is shared across multiple AR devices. For example, the localization score or the mask score can be used as a confidence score of the object recognition output (i.e., bounding box and instance mask) to create or update persistent coordinate frames (PCFs) in the passable world model. In some implementations, the passable world component can further process the object bounding box or the object instance mask in order to generate a new or an updated passable world model.

Based on a passable world model generated or updated from the object recognition output from the neural network 500, the AR system can enable multiple applications and can improve immersive experiences in the applications. Users of the AR system or application developers can place AR contents or applications in the physical world with one or more objects that have been recognized in the scene of the environment. For example, a game application can set a virtual logo at or near the 2-D bounding box of an object that has been recognized in the passable world model.

Having thus described several aspects of some embodiments, it is to be appreciated that various alterations, modifications, and improvements will readily occur to those skilled in the art.

As one example, embodiments are described in connection with an augmented (AR) environment. It should be appreciated that some or all of the techniques described herein may be applied in an MR environment or more generally in other XR environments, and in VR environments.

As another example, embodiments are described in connection with devices, such as wearable devices. It should be appreciated that some or all of the techniques described herein may be implemented via networks (such as cloud), discrete applications, and/or any suitable combinations of devices, networks, and discrete applications.

This specification uses the term "configured" in connection with systems and computer program components. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for neural network training, comprising:
   receiving training data that comprises a plurality of training images and, for each image, a respective ground-truth annotation, the plurality of training images comprising images from a first source and images from a second source;
   obtaining a set of training images from the training data;
   for each training image in the set of training images:
      applying contrast equalization to the training image to generate a modified image; and
      processing the modified image using a neural network to generate an object recognition output for the modified image;
   determining, as a determined loss, a loss based on errors between, for each training image in the set of training images, the object recognition output for the modified image generated from the training image and the respective ground-truth annotation for the training image; and
   updating parameters of the neural network based on the determined loss.

2. The computer-implemented method of claim 1, wherein obtaining a set of training images from the training data, comprises:
   sampling an initial set of images from the training data; and
   generating the set of training images by discarding one or more images from the initial set of images.

3. The computer-implemented method of claim 2, wherein generating the set of training images comprises:
   determining that the one or more images in the initial set of images have motion blur; and
   in response, discarding the one or more images that have motion blur.

4. The computer-implemented method of claim 2, wherein generating the set of training images comprises:
   determining, from respective ground-truth annotations for the training images in the initial set of images, that one or more of the images in the initial set of images depict objects that do not belong to a relevant object category; and
   in response, discarding the one or more images that depict objects that do not belong to a relevant object category.

5. The computer-implemented method of claim 2, wherein generating the set of training images comprises:
   determining that one or more of the images in the initial set of images depict an object that is truncated or occluded; and
   in response, discarding the one or more images that depict an object that is truncated or occluded.

6. The computer-implemented method of claim 5, wherein determining that one or more of the images in the set of training images depict an object that is truncated or occluded comprises:
   obtaining, from respective ground-truth annotations for the training images in the initial set of images, truncation scores or occlusion scores previously computed based on the respective ground-truth annotations, and wherein computing the truncation scores or occlusion scores comprising:
      obtaining, from the respective ground-truth annotations, a three-dimensional (3-D) bounding box and a two-dimensional (2-D) bounding box for an object in a training image from the initial set of images;
      generating a projected 2-D bounding box by projecting the 3-D bounding box to the training image; and
      computing a truncation score or an occlusion score using an overlap between the projected 2-D bounding box and the 2-D bounding box from the respective ground-truth annotations; and
   determining, based on the truncation scores or occlusion scores, that one or more of the images in the initial set of images depict an object that is truncated or occluded.

7. The computer-implemented method of claim 1, wherein determining the loss comprises:
   for each training image in the set of training images:
      determining a count of images from the set of training images that have a same ground-truth annotation as the training image;
      determining, based on the count of images, a weight for the training image; and
      generating, from an error between the object recognition output for the modified image generated from the training image and the respective ground-truth annotation for the training image, a weighted error based on the weight for the training image.

8. The computer-implemented method of claim 7, comprising:
   determining the loss based on weighted errors for training images in the set of training images.

9. The computer-implemented method of claim 7, wherein the respective ground-truth annotation for the training image depicts an object that belongs to a k-th object category among K object categories, and wherein the weight $w_k$ for the training image is $$w_k = 1 + 2 * \left(1 - \frac{c_k}{c_{max}}\right),$$

where $c_k$ is the count of images from the set of training images that has the same ground-truth annotation as the training image, and $c_{max}$ is a maximum value of all values among counts of images $c_i$, $i=1, \ldots, K$.

10. The computer-implemented method of claim 1, wherein the first source is a set of real-world images and the second source is a set of synthetic images.

11. The computer-implemented method of claim 1, wherein the object recognition output comprises:
   a bounding box, and
   a localization score that is a prediction of an intersection-over-union overlap between the bounding box and a ground-truth bounding box.

12. The computer-implemented method of claim 1, wherein the object recognition output comprises:
   an instance mask, and
   a mask score that is a prediction of an intersection-over-union overlap between the instance mask and a ground-truth instance mask.

13. A non-transitory, computer-readable medium storing one or more instructions executable by a computer system to perform operations comprising:
   receiving training data that comprises a plurality of training images and, for each image, a respective ground-truth annotation, the plurality of training images comprising images from a first source and images from a second source;
   obtaining a set of training images from the training data;
   for each training image in the set of training images:
      applying contrast equalization to the training image to generate a modified image; and
      processing the modified image using a neural network to generate an object recognition output for the modified image;
   determining, as a determined loss, a loss based on errors between, for each training image in the set of training images, the object recognition output for the modified image generated from the training image and the respective ground-truth annotation for the training image; and
   updating parameters of the neural network based on the determined loss.

14. The non-transitory, computer-readable medium of claim 13, wherein obtaining a set of training images from the training data, comprises:
   sampling an initial set of images from the training data; and
   generating the set of training images by discarding one or more training images from the initial set of images.

15. The non-transitory, computer-readable medium claim 14, wherein generating the set of training images comprises:
   determining that one or more images in the initial set of images have motion blur; and
   in response, discarding the one or more images that have motion blur.

16. The non-transitory, computer-readable medium of claim 14, wherein generating the set of training images comprises:

determining, from respective ground-truth annotations for the training images in the initial set of images, that the one or more images in the initial set of images depict objects that do not belong to a relevant object category; and
   in response, discarding the one or more images that depict objects that do not belong to a relevant object category.

17. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving training data that comprises a plurality of training images and, for each image, a respective ground-truth annotation, the plurality of training images comprising images from a first source and images from a second source;
      obtaining a set of training images from the training data;
      for each training image in the set of training images:
         applying contrast equalization to the training image to generate a modified image; and
         processing the modified image using a neural network to generate an object recognition output for the modified image;
      determining, as a determined loss, a loss based on errors between, for each training image in the set of training images, the object recognition output for the modified image generated from the training image and the respective ground-truth annotation for the training image; and
      updating parameters of the neural network based on the determined loss.

18. The computer-implemented system of claim 17, wherein obtaining a set of training images from the training data, comprises:
   sampling an initial set of images from the training data; and
   generating the set of training images by discarding one or more training images from the initial set of images.

19. The computer-implemented system of claim 18, wherein generating the set of training images comprises:
   determining that the one or more images in the initial set of images have motion blur; and
   in response, discarding the one or more images that have motion blur.

20. The computer-implemented system of claim 18, wherein generating the set of training images comprises:
   determining, from respective ground-truth annotations for the training images in the initial set of images, that the one or more images in the initial set of images depict objects that do not belong to a relevant object category; and
   in response, discarding the one or more images that depict objects that do not belong to a relevant object category.

* * * * *